(12) United States Patent
Xie et al.

(10) Patent No.: US 8,043,459 B2
(45) Date of Patent: Oct. 25, 2011

(54) REVERSIBLE DRY ADHESIVES FOR WET AND DRY CONDITIONS

(75) Inventors: Tao Xie, Troy, MI (US); Xingcheng Xiao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 285 days.

(21) Appl. No.: 12/391,704

(22) Filed: Feb. 24, 2009

(65) Prior Publication Data

US 2010/0212820 A1    Aug. 26, 2010

(51) Int. Cl.
 B32B 37/12 (2006.01)
 B32B 37/06 (2006.01)
 C08F 283/00 (2006.01)
 C08G 59/02 (2006.01)
(52) U.S. Cl. .................. 156/242; 525/523; 525/534
(58) Field of Classification Search .......... 156/242; 525/523, 534
See application file for complete search history.

(56) References Cited

U.S. PATENT DOCUMENTS

| | | | |
|---|---|---|---|
| 5,755,913 A | 5/1998 | Liaw et al. | |
| 6,759,481 B2 | 7/2004 | Tong | |
| 6,773,535 B1 | 8/2004 | Wetzel | |
| 6,827,325 B2 | 12/2004 | Hofmann et al. | |
| 6,986,855 B1 | 1/2006 | Hood et al. | |
| 7,188,498 B2 | 3/2007 | Browne et al. | |
| 2001/0047579 A1 | 12/2001 | Lee et al. | |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |
| 2005/0274455 A1 | 12/2005 | Extrand | |
| 2006/0036045 A1 | 2/2006 | Wilson et al. | |
| 2006/0156535 A1 | 7/2006 | Browne et al. | |
| 2007/0073130 A1 | 3/2007 | Finch et al. | |
| 2007/0289786 A1 | 12/2007 | Cutkosky et al. | |

OTHER PUBLICATIONS

Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.
Xie et al., Self-Peeling Reversible Dry Adhesive System, Chem. Mater., 2008, pp. 2866-2868, vol. 20.
Liu et al., Chemically Cross-Linked Polycyclooctene: Synthesis, Characterization and Shape Memory Behavior, Macromolecules, 2002. pp. 9868-9874, vol. 35.
Lendlein et al., Biodegradable, Elastic Shape-Memory Polymers for Potential Biomedical Applications, Science, May 31, 2002, pp. 1673-1676, vol. 296.
Lee et al., Structure and Thermomechanical Properties of Polyurethane Block Copolymers with Shape Memory Effect, Macromolecules, 2001, pp. 6431-6437, vol. 34.
Lin et al., Study on Shape-Memory Behavior of Polyether-Based Polyurethanes. I. Influence of the Hard-Segment Content, J. of Applied Polymer Science, 1998, pp. 1563-1574, V.69.
Lin et al., Study on Shape-Memory Behavior of Polyether-Based Polyurethanes. II. Influence of Soft-Segment Molecular Weight, J. of App. Polymer Science, 1998, pp. 1575-1586, 69.

(Continued)

Primary Examiner — Katarzyna Wyrozebski Lee
Assistant Examiner — Daniel Lee
(74) Attorney, Agent, or Firm — Reising Ethington P.C.

(57) ABSTRACT

One embodiment includes a dry adhesive material including catechol chemically attached to the surface of a shape memory polymer molecule. The catechol content may allow the dry adhesive to be utilized in both dry and wet conditions to bond objects together. The shape memory polymer may allow the dry adhesive to be reversibly attached to the objects.

15 Claims, 3 Drawing Sheets

OTHER PUBLICATIONS

EPON Resin 828 Structural Reference Manual, Shell Chemicals, Houston, TX.

Gall et al., Shape Memory Polymer Nanocomposites, Acta Materialia, 2002, pp. 5115-5126, vol. 50.

Gall et al., Internal Stress Storage in Shape Memory Polymer Nanocomposites, Applied Physics Letter, Jul. 12, 2004, pp. 290-292, vol. 85, No. 2.

Xu et al., Synthesis and Shape Memory Effects of Si-O-Si Cross-Linked Hybrid Polyurethanes, Polymer, 2006, pp. 457-465, vol. 47.

Crystallisation of Liquid DGEBPA and DGEBPF Epoxy Resins, Resolution Performance Products, Product Bulletin, SC:2365-01, Jul. 2001.

Jeffamine D-230 Polyetheramine, Technical Bulletin, Huntsman Corporation, Copyright 2006.

Xie et al., Self-Peeling Reversible Dry Adhesive System, Materials, & Processes Laboratory, General Motors Research & Development Center, Chem. Mater. 2008,vol. 20, pp. 2866-2.

Aubert et al., Thermally Removable Epoxy Adhesives Incorporating Thermally Reversible Diels-Alder Adducts, The Journal of Adhesion, 2003, vol. 79, pp. 609-616.

International Search Report and Written Opinion, International Application No. PCT/US/2008/060796 Filed Apr. 18 2008, Appicant GM Global Technology Operations, Inc.

Unver et al., Geckbot: A Gecko Inspired Climbing Robot Using Elastomer Adhesives.

Daltorio et al., A Small Wall-Walking Robot with Compliant, Adhesive, Feet, IEEE/RSJ International Conference on Intelligent Robots and Systems, 2005, pp. 4018-4023.

International Search Report and Written Opinon, International Application No. PCT/US2008/060826 filed Apr. 18, 2008, Applicant GM Global Technology Operations, Inc.

Lee et al., A Reversible Wet/Dry Adhesive Inspired by Mussels and Geckos, Nature, Jul. 19, 2007, pp. 338-342, vol. 448.

Lee et al., Single-Molecule Mechanics of Mussel Adhesion, PNAS, Aug. 29, 2005, pp. 12999-13—3, vol. 103, No. 35.

Veriflex Shape Memory Polymer, http://www.crgrp.net/veriflex.shtml, Cornerstone Research Group, Inc., 2003-2007.

Shape Memory Polymer, http://crgnp.net/success-stories.shtml, Cornerstone Research Group, Inc., 2003-2007.

TEMBO Shape Memory Polymers and Elastic Memory Composite (EMC) Material, http://www.ctd-materials.com/products/emc.htm, Cornerstone Research Group, Inc., 2003-2007.

Behl et al., Shape-Memory Polymers: Dual Shape Materials for Bio-medical Applications, A. Mater. Today, 2007, vol. 10, pp. 1-20.

Bellin et al., Polymeric Triple-Shape Materials, PNAS, Nov. 28, 2006, vol. 103, No. 48, pp. 18043-18047.

Chung et al., Two-Way Reversible Shape Memory in a Semicrystalline Network, Macromolecules, 2008, vol. 41, pp. 184-192.

Rousseau et al., Shape Memory Effect Exhibited by Smectic-C Liquid Crystalline Elastomers, J. Am. Chem. Soc., 2003, vol. 125, pp. 15300-15301.

Liu et al., Review of Progress in Shape-Memory Polymers, Journal of Materials Chemistry, 2007, vol. 17, pp. 1543-1558.

Dietsch et al., A Review—Features and Benefits of Shape Memory Polymers (SMPs), Journal of Advanced Materials, Apr. 2007, vol. 39, No. 2, pp. 3-12.

Li et al., Shape Memory Effect of Ethylene—Vinyl Acetate Copolymers, Journal of Applied Polymer Science, 1999, vol. 71, pp. 1063-1070.

Liu et al., Novel Shape-Memory Polymer with Two Transition Temperatures, Macromol, Rapid Commun., 2005, vol. 26, pp. 649-652.

Reyntjens et al., Polymer Networks Containign Crystallizable Poly(octadecyl vinyl ether) Segments for Shape-Memory Materials, Macromol. Rapid Commun., 1999, vol. 20,pp. 251-255.

Jiang et al., Polymers Move in Response to Light, Advanced Materials., 2006, vol. 18, pp. 1471-1475.

Huang et al., Water-Driven Programmable Polyurethane Shape Memory Polymer: Demonstration and Mechanism, Applied Physical Letters, 2005, vol. 86, pp. 114105-1—3.

Lendlein et al., Light-Induced Shape-Memory Polymers, Nature, Apr. 14, 2005, vol. 434, pp. 879-882.

Goethals et al., Poly(vinyl ethers) as Building Blocks for New Materials, Macromol. Symp. 1998, vol. 132, pp. 57-64.

Xiao, U.S. Appl. No. 12/273,083, Self-Healing and Scratch Resistant Shape Memory Polymer System, filed Nov. 18, 2008.

Xie, U.S. Appl. No. 11/867,531, Reversible Dry Adhesives, filed Oct. 4, 2007.

Xie, U.S. Appl. No. 12/396,045, Polymer Systems with Multiple Shape Memory Effect, filed Mar. 2, 2009.

Xie, U.S. Appl. No. 12/367,826, A Reversible Welding Process for Polymers, filed Feb. 9, 2009.

Xie, U.S. Appl. No. 12/178,844, High Strength Reversible Noncovalent Adhesion Methods for a Solid Polymer-Polymer Interface, filed Jul. 24, 2008.

Cheng, U.S. Appl. No. 12/359,709, Remote Activation of Thermo-Reversible Dry Adhesives, filed Jan. 26, 2009.

Xie, U.S. Appl. No. 12/423,947, Shape Memory Polymer and Adhesive Combination and Methods of Making and Using the Same, filed Apr. 15, 2009.

Xie, U.S. Appl. No. 12/432,211, Shape Memor Polymers with Surface Having Dangling Adhesive Polymeric Chains and Methods of Making and Using the Same, filed Apr. 29, 2009.

Xie, U.S. Appl. No. 12/181,562, Polymer Systems with Multiple Shape Memory Effect, filed Jul. 29, 2008.

Xie, U.S. Appl. No. 11/867,549, Method of Miniimizing Residue Adhesion for Thermo-Reversible Dry Adhesives, filed Oct. 4, 2007.

Xie, U.S. Appl. No. 12/105,865, Attachment Pad with Thermal Reversible Adhesive and Methods of Making and Using the Same, filed Apr. 18, 2008.

Xie, U.S. Appl. No. 11/867,558, Multilayer Adhesive for Thermal Reversible Joining of Substrates, filed Oct. 4, 2007.

Xie, U.S. Appl. No. 12/391,704, Reversible Dry Adhesives for Wet adn Dry Conditions, filed Feb. 24, 2009.

Xie, U.S. Appl. No. 12/105,749, Method for Robotic Handling Using Thermo-Reversible Dry Adhesives, filed Apr. 18, 2008.

Xie, U.S. Appl. No. 12/105,788, Climbing Devices Based on Thermo-Reversible Dry Adhesives, filed Apr. 18, 2008.

Xie, USSN Oct. 4, 2007, Shape Memory Epoxy Polymers, filed Oct. 4, 2007.

REVERSIBLE DRY ADHESIVES FOR WET AND DRY CONDITIONS

TECHNICAL FIELD

The technical field generally relates to polymer adhesives and more specifically to reversible dry adhesives for wet and dry conditions.

BACKGROUND

Dry adhesives are sticky and are used to bond objects together. Typically, dry adhesives may only be applied under dry conditions (i.e. non-aqueous conditions), or are otherwise non-reversible.

Mussels are known to adhere to a wide variety of surfaces under both dry and wet conditions. It is believed a protein containing a high content of catechol (catecholic amino acid 3,4-dihydrocy-L-phenylalanine (DOPA)) may be responsible for the mussel's ability to adhere in both wet and dry conditions in which most adhesives function poorly. Lee, H., et al., Nature 448, pp. 338-342 (2007); Lee, H., et al., PNAS Vol. 103, No. 35, pp. 12999-13003 (Aug. 29, 2006). Both natural and synthetic adhesives containing DOPA and its derivatives have demonstrated strong interfacial adhesion strength. Studies have indicated that DOPA may form strong yet reversible bonds with surfaces, especially oxide surfaces.

SUMMARY OF EXEMPLARY EMBODIMENTS

An exemplary embodiment discloses a dry adhesive material includes catechol that is chemically attached to a surface of a shape memory polymer. The catechol content may allow the dry adhesive to be utilized in both dry and wet conditions to bond objects together. The shape memory polymer may allow the dry adhesive to be reversibly attached to the objects.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Shape memory polymers (SMPs) represent responsive polymers that can fix to deformed temporary shapes and recover to their permanent (original) shapes only upon external stimuli. SMPs may be available exhibiting a dual shape memory effect (DSME), wherein the SMP can only memorize one temporary shape in addition to its permanent shape in each shape memory cycle. It is also contemplated that SMPs may be available exhibiting a triple shape memory effect (TSME) or greater, wherein the SMP can memorize two distinct temporary shapes (for a TSME) or more in addition to its permanent shape in each memory cycle.

In general, to transform an SMP from its permanent shape to its temporary shape, the permanent shape may be heated to a first elevated temperature and then deformed under stress to yield the first temporary shape, a shape which may be different in visual appearance from the permanent shape. By definition, the first elevated temperature is a temperature sufficiently high to ensure a phase transition of the SMP (i.e. is a temperature above the glass transition temperature ($T_g$) of SMP). The SMP may then be cooled under stress to a temperature below the glass transition temperature of one SMP, wherein the stress may be relieved while maintaining the first temporary shape. To recover the permanent shape from the first temporary shape, the SMP may be reheated to the first elevated temperature in the absence of stress. SMP materials may also be constructed to transform shapes under other stimuli other than heat, such as electrical, magnetic, etc.

An exemplary embodiment creates a dry adhesive from a SMP material that takes advantage of the SMP's ability to transform from a permanent shape to a temporary shape. Moreover, the exemplary embodiments chemically bonding catecholic amino acid (catechol, or 3,4-dihydrocy-L-phenylalanine (DOPA)), to an SMP surface that may allow the dry adhesive to be used in both wet and dry conditions.

Figure 1:
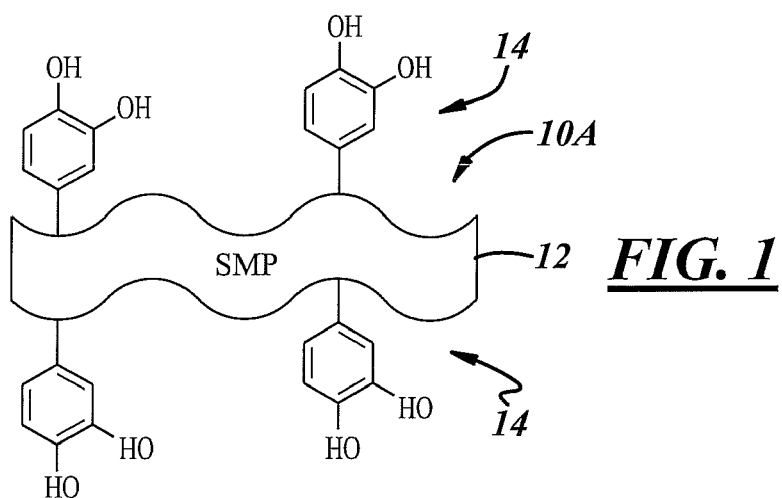
FIG. 1 is a schematic illustration of a dry adhesive material in its permanent shape according to one exemplary embodiment having one or more catechol molecules chemically attached to a shape memory polymer.

Referring first to FIG. 1, in one exemplary embodiment, a dry adhesive material 10 may be formed having a shape memory polymer (SMP) material 12. A high concentration of catechol molecules 14 (catecholic amino acid, or 3,4-dihydrocy-L-phenylalanine (DOPA)) may be chemically attached to corresponding reactive groups on the surface of the shape memory polymer material 12. In select exemplary embodiments, the content of catechol molecules 14 along the surface of the SMP 12 may achieve a surface coverage of about 1 and 100%. By chemically reacting catechol, which is normally soluble in water, to a corresponding reactive group on the surface of the SMP 12 to produce a non-soluble adhesive 10, the catechol molecule 14 may utilize its unique properties to adhere with one or more substrates (shown as substrates 22 and 24 in FIGS. 3 and 4 below) in both an aqueous and non-aqueous environment.

In one non-limiting exemplary embodiment, branched polyethyleneimine (BPEI) polymer of varying molecular weights may be grafted onto a crosslinked epoxy SMP material to form the material 12 having amine groups that are accessible to chemically react with the catechol. In another non-limiting exemplary embodiment, the material 12 may be formed from a copolymer including 3,4-dimethoxy styrene (DMS) reacted with divinyl benzene (DVB) and benzoyl peroxide to create a crosslinked SMP having methoxy groups on its surface that can be further converted chemically to catechol. In one embodiment the weight ratio of DMS, DVB and benzoyl peroxide may be 90/5/5. In still another exemplary embodiment, a shape memory polymer 12 based on piperonulamine (1,3-benzodioxyl-5-yl-methanamine) mixed with diepoxide and multiamine curing agents may be formed that includes acetal surface groups that can be chemically converted to catechol. These materials are described below with respect to Examples 1-4 and FIGS. 5-8. Of course, many other polymeric materials not listed herein may be available for use as the polymeric material 12, provided that they are capable of chemically reacting to produce catechol on its surface and further that the formed adhesive material 10 is non-soluble in water.

Figure 2:
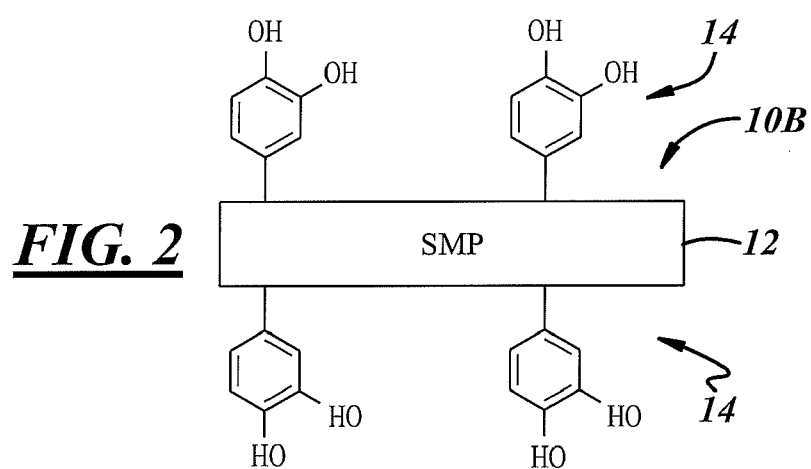
FIG. 2 is a schematic illustration of the dry adhesive material of FIG. 1 transformed from its permanent shape to a temporary shape.
Figure 3:
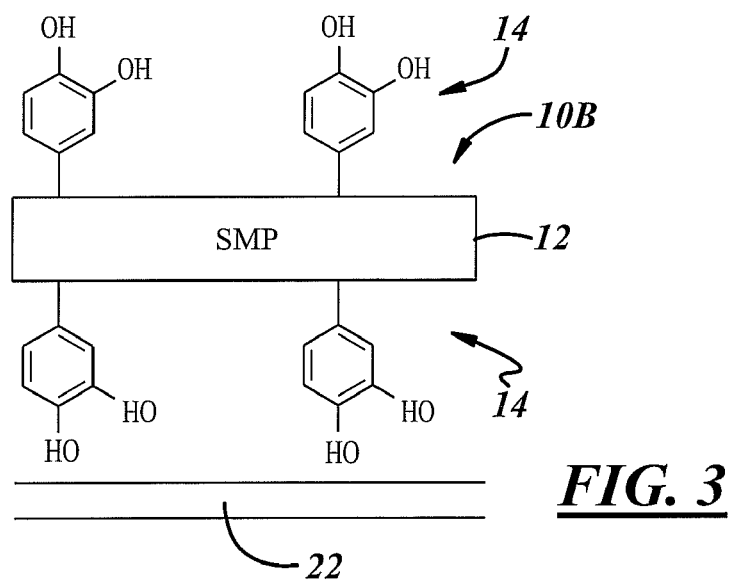
FIG. 3 a schematic illustration of is the dry adhesive material of FIG. 2 coupled to a substrate material.
Figure 4:
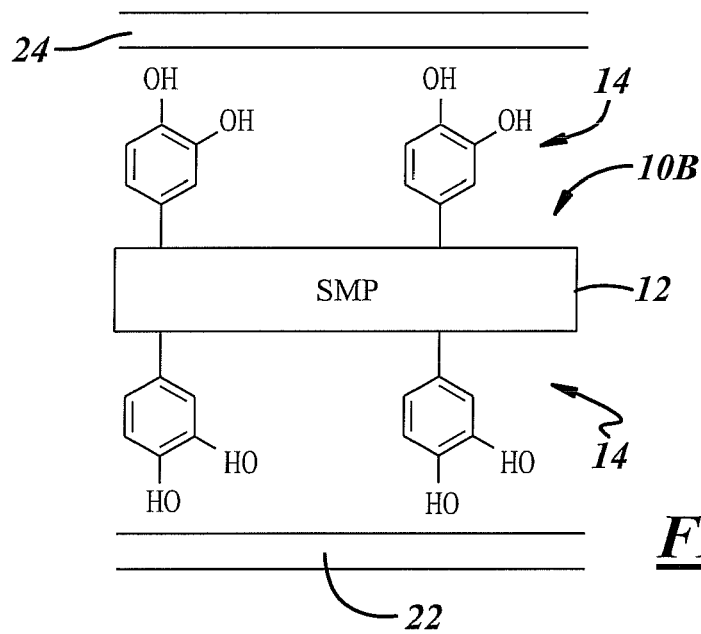
FIG. 4 is the dry adhesive material of FIG. 2 coupled between two substrate materials.

In order to utilize the dry adhesive properties of the shape memory polymer adhesive material 10, the adhesive material 10 may be hot-pressed under a load and cooled under load. The hot pressing process may transform the dry adhesive material 10 having the shape memory polymer backbone 12 from its permanent shape 10A, as shown in FIG. 1, to its temporary shape 10B, as shown in FIG. 2. In its temporary shape 10B, the hydroxyl-group containing catechol molecules 14 on the surface of material 12 may be more accessible for interaction to a single substrate material 22, as shown in FIG. 3, or between two substrate materials 22 and 24, as shown in FIG. 4.

The substrate materials 22 and 24 may be formed of the same material or separate materials. Non-limiting examples of substrate materials 22 and 24 include glass substrates, polymer substrates, metal substrates and other non-metal substrates.

The hydroxyl functionality of the catechol molecules 14 may interact with the substrate materials 22 or 24 to create a level of adherence, or bonds, of varying adhesive strength, depending upon the nature of the substrate material 22, 24. For example, the hydroxyl functionality may create hydrogen bonds between the adhesive material 10 and the substrate 22, 24. Further, the hydroxyl functionality could chemically react with the surface of the substrate material 22 or 24, such as via condensation reactions or the like. Moreover, the hydroxyl functionality may create other types of interactions well known to those of ordinary skill in the adhesive arts.

Most specifically, the catechol molecules 14 are thought to provide adhesion strength of up to about 9 $N/cm^2$ when used to adhere to oxide containing substrate materials 22, 24.

By increasing the likelihood of such interaction with the substrate 22 or 24, which occurs when the adhesive material 10 is transformed to the temporary state 10B and the hydroxyl groups are moved such that there are more possible interactions with the substrate 22 or 24, the adhesive strength may be increased as compared with when the adhesive material 10 is in its permanent state 10A.

The catechol molecules 14 may be chemically coupled to the surface of an SMP 12 in many different ways to form dry adhesive materials 10 that can be used in both wet and dry conditions. Four exemplary reaction paths are disclosed below.

EXAMPLE 1

Figure 5:
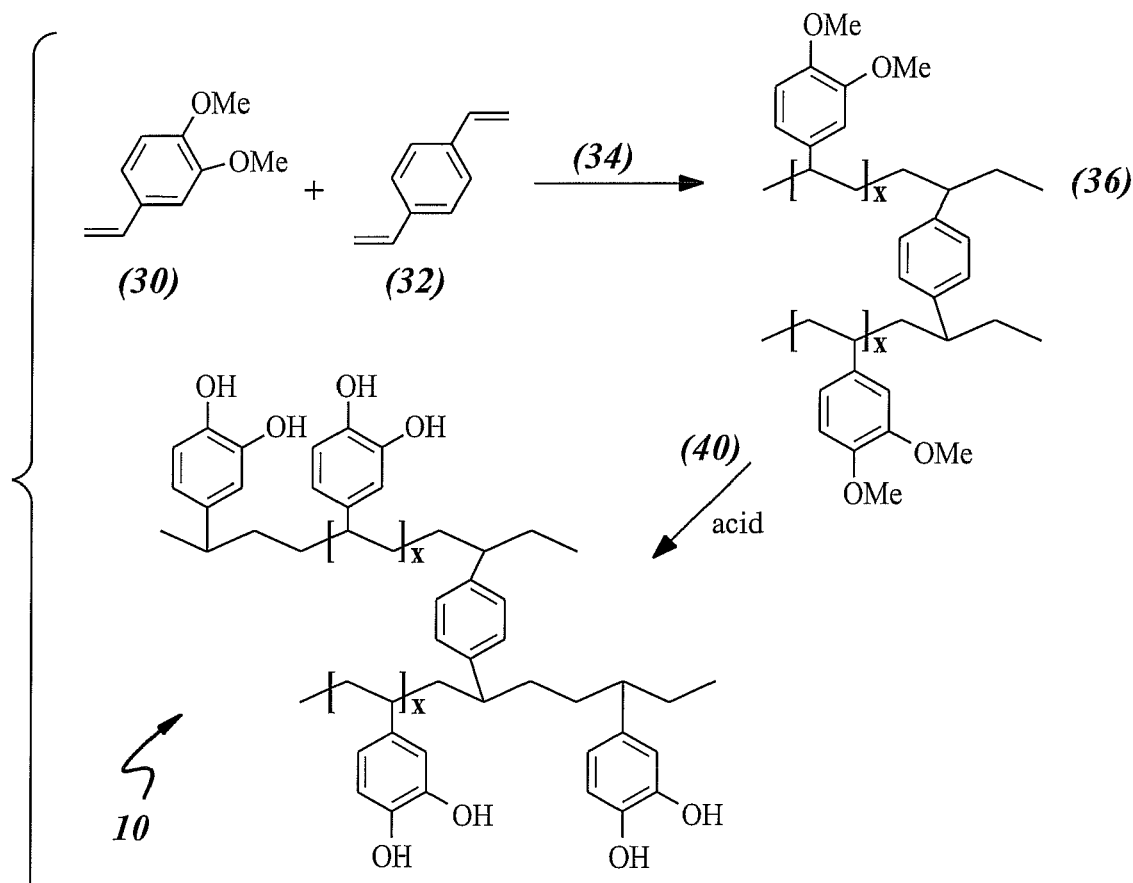
FIG. 5 illustrates one exemplary reaction path for forming an dry adhesive material having one or more catechol molecules chemically attached to a shape memory polymer.

FIG. 5 illustrates one exemplary reaction path for forming a dry adhesive material including an SMP polymer having catechol surface groups. 3,4 dimethoxystyrene, or DMS 30, is copolymerized with a small amount of crosslinker (such as divinyl benzene, or DVB 32), using a benzoyl peroxide initiator, or BPO 34, to produce a crosslinked polymer 36 having 3,4 dimethoxyl benzene (i.e. methoxy groups) on its surface. To accomplish this, in one exemplary formulation, the DMS 30, DVB 32 and BPO 34 are mixed in a weight ratio of 90/5/5 and degassed under nitrogen for ten minutes. The mixture was then cured at about eighty degrees Celsius for about twenty-four hours in a sealed mold in a nitrogen environment and then demolded to yield a crosslinked polymer 36.

The methoxy groups of crosslinked polymer 36 are then converted into dihydroxy groups by immersing the crosslinked polymer 36 in a boron tribromide solution, or $BBr_3$ 40 (in 1M dichloromethane), in a nitrogen environment for about 18 hours. The mixture was then immersed in acidic water (pH about 1) for about 24 hours and rinsed in deionized water to yield a crosslinked SMP polymer 10 having catechol groups 14 on its surface.

EXAMPLE 2

Figure 6:
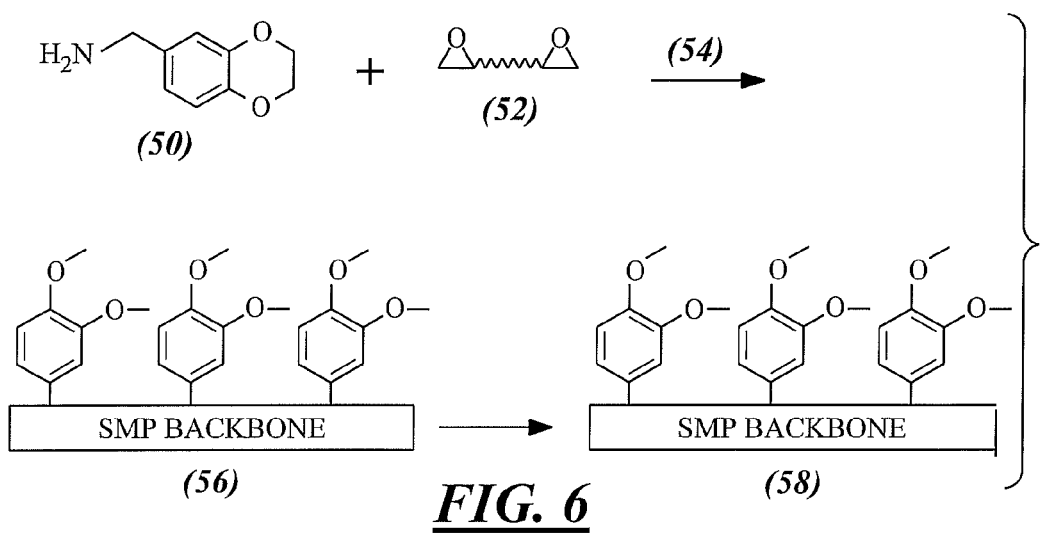
FIG. 6 illustrates another exemplary reaction path for forming an dry adhesive material having one or more catechol molecules chemically attached to a shape memory polymer.
Figure 7:
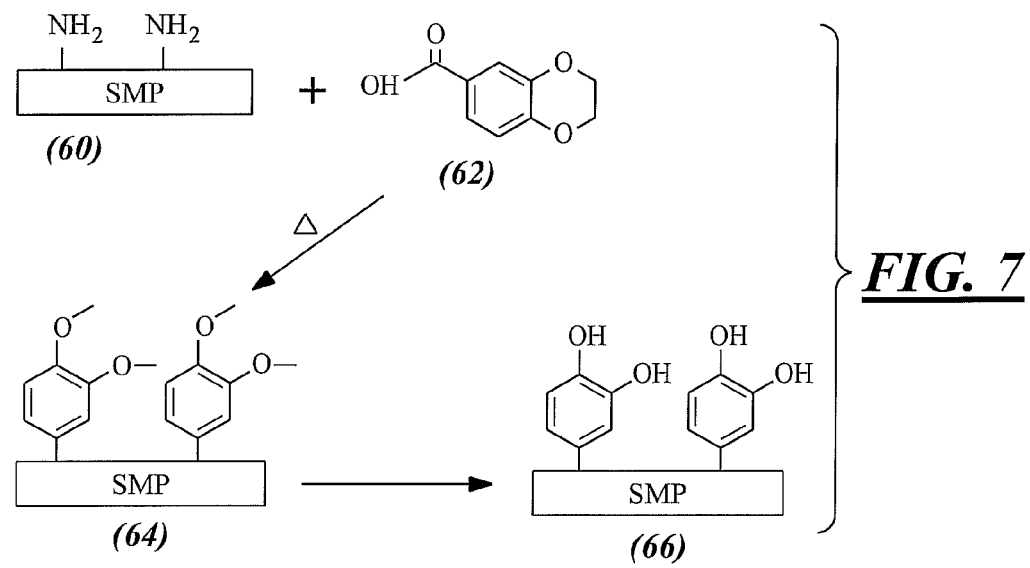
FIG. 7 illustrates still another exemplary reaction path for forming an dry adhesive material having one or more catechol molecules chemically attached to a shape memory polymer.
Figure 8:
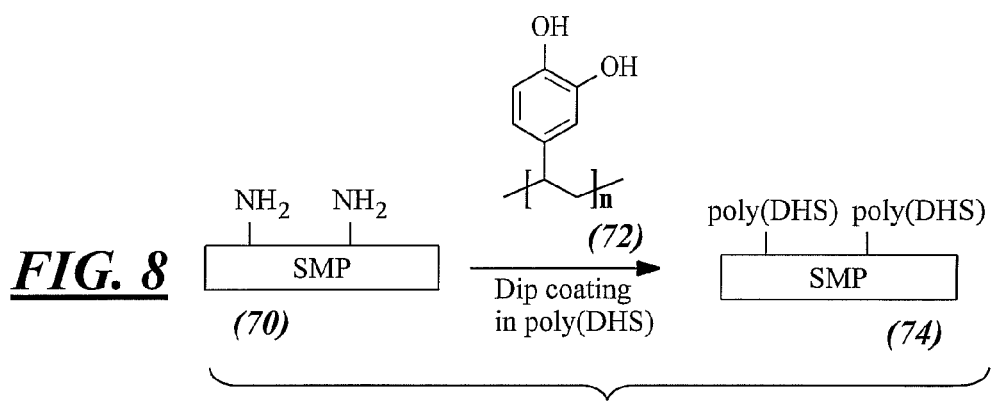
FIG. 8 illustrates yet another exemplary reaction path for forming a dry adhesive material having one or more catechol molecules chemically attached to a shape memory polymer.

In another exemplary example for forming a dry adhesive material including an SMP polymer having catechol surface groups, as shown in FIG. 6, piperonulamine 50 (1,3-benzodioxol-5-yl-methanamine) is first mixed with a diepoxide 52 and a multiamine curing agent 54. The mixture is cured thermally, forming a structure 56 including an acetal structure. The acetal structure is further converted to yield a crosslinked SMP polymer having catechol surface groups 58.

EXAMPLE 3

In another exemplary example for forming a dry adhesive material including an SMP polymer having catechol side groups, a crosslinked epoxy material was synthesized by melting 4.68 g of EPON 826 at 80 degrees Celsius and mixing the melted epoxy with 1.51 g of NGDE and 2.16 g of Jeffamine D-230. The liquid mixture was degassed under vacuum for 30 minutes, cured under ambient pressure in an aluminum pan at 100 degrees Celsius for 1 hour. After cooling to room temperature, the cured epoxy polymers were demolded.

A branched polyethyleneimine (BPEI) molecule was then grafted onto the crosslinked epoxy surface. Excess BPEI (50 wt % aqueous solution) was spread onto the epoxy surface and the grafting reaction proceeded at 80 degrees Celsius for 2 hours. Afterwards, the sample was sonicated in methanol for 10 minutes at room temperature, and the process was repeated two more times with fresh methanol. The sample was post cured at 130 degrees Celsius for 1 hour, rinsed with isopropanol, and blow dried prior to use to form a PEI grafted epoxy SMP, shown as 60 in FIG. 7.

Next, the PEI grafted epoxy SMP 60 is dipped in a water solution containing piperonylic acid 62. The amine groups on the PEI grafted epoxy SMP then react with the carboxylic acid group on the piperonylic acid to form a treated crosslinked SMP. The treated crosslinked SMP is heated to promote the dehydrate reaction to form a crosslinked SMP having an acetal structure 64. Finally, the acetal groups of the crosslinked SMP 64 are converted to hydroxyl groups to yield a crosslinked SMP having catechol surface groups 66.

EXAMPLE 4

In another exemplary example for forming a dry adhesive material including an SMP having catechol surface groups, a PEI grafted SMP was first formed in accordance with Example 3 below. This is shown as reference numeral 70 in FIG. 8.

Next, a non-crosslinked version of DHS (shown as structure 72 in FIG. 8) was produced in substantially the same manner above as DHS was produced in Example 1, with the exception that no DVB was present during the polymerization and further that the poly(DMS) was dissolved in dichloromethane during the deprotection step.

Next the PEI grafted SMP 70 was dipped in an aqueous solution of structure 72 and dried to yield a crosslinked SMP having catechol surface groups 74.

The above description of embodiments of the invention is merely exemplary in nature and, thus, variations thereof are not to be regarded as a departure from the spirit and scope of the invention.

What is claimed is:

1. A method comprising:
   providing a first substrate and a second substrate;
   forming a shape memory polymer adhesive system comprising a shape memory polymer material having a plurality of catechol surface groups, said shape memory polymer adhesive system transformable from a permanent shape to a temporary shape;
   transforming said shape memory polymer adhesive system from said permanent shape to said temporary shape; and
   coupling said first substrate to said second substrate with said shape memory polymer adhesive system in said temporary shape.

2. The method of claim 1, wherein transforming said shape memory polymer adhesive system from said permanent shape to said temporary shape comprises:
   transforming said shape memory polymer adhesive system from said permanent shape to said temporary shape by heating said shape memory polymer adhesive system to a first temperature under a load, said first temperature being above the glass transition temperature of said shape memory polymer substrate material;
   cooling said shape memory polymer adhesive system in said temporary shape below said first temperature; and removing said load;
   wherein at least a portion of said plurality of catechol surface groups are more accessible to said first substrate or more accessible to said second substrate when said shape memory polymer adhesive system is in said temporary shape than in said permanent shape.

3. The method of claim 2 further comprising:
   uncoupling said first substrate from said second substrate by heating said shape memory polymer adhesive system above said first temperature in the absence of said load.

4. The method of claim 1, wherein forming a shape memory polymer adhesive system comprises:
   forming a shape memory polymer; and
   forming a plurality of catechol surface groups on said shape memory polymer material.

5. The method of claim 4, wherein forming a shape memory polymer backbone and forming a plurality of catechol surface groups on said shape polymer memory material comprises:
   copolymerizing 3, 4 dimethoxystyrene with divinyl benzene in a benzoyl peroxide initiator to produce a crosslinked polymer having 3, 4 dimethoxyl benzene on its surface;
   converting one or more methoxy groups of said crosslinked polymer into dihydroxy groups by immersing said crosslinked polymer in a boron tribromide solution;
   immersing said crosslinked polymer having said one or more dihydroxy groups in acidic water; and
   rinsing said crosslinked polymer in deionized water.

6. The method of claim 4, wherein forming a shape memory polymer material and forming a plurality of catechol surface groups on said shape polymer memory comprises:
   forming a crosslinked epoxy material;
   coupling a branched polyethyleneimine material to said crosslinked epoxy material to form a polyethyleneimine grafted epoxy shape memory polymer material;
   copolymerizing 3, 4 dimethoxystyrene in a benzoyl peroxide initiator to produce a crosslinked polymer having 3, 4 dimethoxyl benzene on its surface;
   dissolving said crosslinked polymer in dichloromethane; and
   dipping said polyethyleneimine grafted epoxy shape memory polymer material in an aqueous solution of said crosslinked polymer.

7. The method of claim 4, wherein forming a shape memory polymer material and forming at least one catechol surface group on said shape polymer memory material comprises:
   mixing piperonulamine with a diepoxide and a multiamine curing agent to form a mixture;
   curing said mixture to form a crosslinked polymer having a plurality of acetal structures; and
   converting said plurality of acetal structures to a plurality of hydroxyl structures.

8. The method of claim 4, wherein forming a shape memory polymer material and forming at least one catechol surface group on said shape polymer memory material comprises:
   forming a crosslinked epoxy material;
   coupling a branched polyethyleneimine material to said crosslinked epoxy material to form a polyethyleneimine grafted epoxy shape memory polymer material;
   dipping said polyethyleneimine grafted epoxy shape memory polymer material in a water solution containing piperonylic acid to form a treated crosslinked shape memory polymer structure;
   heating said treated crosslinked shape memory polymer structure to form a crosslinked shape memory polymer having a plurality of acetal structures; and
   converting said plurality of acetal structures to a plurality of hydroxyl structures.

9. The method of claim 1, wherein coupling said first substrate to said second substrate with said shape memory polymer adhesive system in said temporary shape comprises:
   coupling said first substrate to at least one of said plurality of catechol side chains of said shape memory polymer adhesive system in said temporary shape; and
   coupling said second substrate to at least another one of said plurality of catechol side chains of said shape memory polymer adhesive system in said temporary shape.

10. A method comprising:
    providing a first substrate;
    forming a shape memory polymer adhesive system comprising a shape memory polymer substrate material having one or more catechol surface groups, said shape memory polymer adhesive system transformable from a permanent shape to a temporary shape comprising;
    transforming said shape memory polymer adhesive system from said permanent shape to said temporary shape, wherein said one or more catechol surface groups are more accessible to said first substrate in said temporary shape; and coupling said first substrate to said one or more catechol surface groups of said shape memory polymer adhesive system in said temporary shape.

11. The method of claim 10, wherein transforming said shape memory polymer adhesive system from said permanent shape to said temporary shape comprises:
heating said shape memory polymer adhesive system to a first temperature under a load, said first temperature being above the glass transition temperature of said shape memory polymer substrate material;
cooling said shape memory polymer adhesive system in said temporary shape below said first temperature; and
removing said load;
wherein at least a portion of said one or more of catechol surface groups are more accessible to said first substrate when said shape memory polymer adhesive system is in said temporary shape than in said permanent shape.

12. The method of claim 10, wherein forming a shape memory polymer adhesive system comprises:
copolymerizing 3, 4 dimethoxystyrene with divinyl benzene in a benzoyl peroxide initiator to produce a crosslinked polymer having 3, 4 dimethoxyl benzene on its surface;
converting one or more methoxy groups of said crosslinked polymer into dihydroxy groups by immersing said crosslinked polymer in a boron tribromide solution;
immersing said crosslinked polymer having said one or more dihydroxy groups in acidic water; and
rinsing said crosslinked polymer in deionized water.

13. The method of claim 10, wherein forming a shape memory polymer adhesive system comprises:
forming a crosslinked epoxy material;
coupling a branched polyethyleneimine material to said crosslinked epoxy material to form a polyethyleneimine grafted epoxy shape memory polymer material;
copolymerizing 3, 4 dimethoxystyrene in a benzoyl peroxide initiator to produce a crosslinked polymer having 3, 4 dimethoxyl benzene on its surface;
dissolving said crosslinked polymer in dichloromethane; and
dipping said polyethyleneimine grafted epoxy shape memory polymer material in an aqueous solution of said crosslinked polymer.

14. The method of claim 10, wherein forming a shape memory polymer adhesive system comprises:
mixing piperonulamine with a diepoxide and a multiamine curing agent to form a mixture;
curing said mixture to form a crosslinked polymer having a plurality of acetal structures; and
converting said plurality of acetal structures to a plurality of hydroxyl structures.

15. The method of claim 10, wherein forming a shape memory polymer adhesive system comprises:
forming a crosslinked epoxy material;
coupling a branched polyethyleneimine material to said crosslinked epoxy material to form a polyethyleneimine grafted epoxy shape memory polymer material;
dipping said polyethyleneimine grafted epoxy shape memory polymer material in a water solution containing piperonylic acid to form a treated crosslinked shape memory polymer structure;
heating said treated crosslinked shape memory polymer structure to form a crosslinked shape memory polymer having a plurality of acetal structures; and
converting said plurality of acetal structures to a plurality of hydroxyl structures.

* * * * *